US012560705B2

(12) United States Patent
Sun et al.

(10) Patent No.: US 12,560,705 B2
(45) Date of Patent: Feb. 24, 2026

(54) OBSTACLE DETECTION METHOD AND SYSTEM OF MMWAVE RADAR AND VEHICLE

(71) Applicant: Huizhou DESAY SV Intelligent Transportation Technological Institute Co., LTD., Huizhou (CN)

(72) Inventors: Jinghu Sun, Huizhou (CN); Jian Wu, Huizhou (CN); Jiahuan Liu, Huizhou (CN); Yuanjie Shen, Huizhou (CN); Yulin Wu, Huizhou (CN)

(73) Assignee: Huizhou DESAY SV Intelligent Transportation Technological Institute Co., LTD., Huizhou (CN)

( * ) Notice: Subject to any disclaimer, the term of this patent is extended or adjusted under 35 U.S.C. 154(b) by 323 days.

(21) Appl. No.: 18/215,835

(22) Filed: Jun. 29, 2023

(65) Prior Publication Data

US 2024/0027611 A1 Jan. 25, 2024

(30) Foreign Application Priority Data

Jul. 13, 2022 (CN) .......................... 202210828334.2

(51) Int. Cl.
G01S 13/931 (2020.01)
G01S 7/292 (2006.01)
(Continued)

(52) U.S. Cl.
CPC .......... G01S 13/931 (2013.01); G01S 7/2923 (2013.01); G01S 7/32 (2013.01); G01S 7/411 (2013.01)

(58) Field of Classification Search
CPC ........ G01S 13/931; G01S 7/2923; G01S 7/32; G01S 7/411
See application file for complete search history.

(56) References Cited

U.S. PATENT DOCUMENTS 9,784,820 B2 10/2017 Agrage
2008/0198072 A1* 8/2008 Elwell .................. G01C 21/206
342/357.29
(Continued)

FOREIGN PATENT DOCUMENTS

CN 113030890 A 6/2021
CN 113589270 A 11/2021
(Continued)

OTHER PUBLICATIONS

SIPO, Search Report and First Notice of Review Opinion, App. No. 202210828334.2, Dec. 9, 2024.

*Primary Examiner* — William Kelleher
*Assistant Examiner* — Hailey R Le
(74) *Attorney, Agent, or Firm* — Hemisphere Law, PLLC

(57) ABSTRACT

The present invention provides an obstacle detection method, an obstacle detection system and a vehicle. An original range profile is separated to obtain a first range profile of a first target according to echo signal models, therefore a two-dimensional position coordinate of the first target is determined. The first target is in front of or beside a second target and is in an invisible line of sight of the mmWave radar, and the second target is in a direct line of sight of the mmWave radar. By adopting a signal separation method in the present invention, the first range profile can be effectively separated from an original range profile, thereby reducing interference of a range profile of the second target, and obtaining an accurate position of the first target.

16 Claims, 4 Drawing Sheets

(51) Int. Cl.
    *G01S 7/32*         (2006.01)
    *G01S 7/41*         (2006.01)

(56)            References Cited

U.S. PATENT DOCUMENTS

| | | | |
|---|---|---|---|
| 2019/0065864 A1* | 2/2019 | Yu | G06V 10/764 |
| 2022/0262133 A1* | 8/2022 | Iglesias | G06V 20/58 |
| 2022/0366701 A1 | 11/2022 | Popov et al. | |
| 2023/0228840 A1* | 7/2023 | Cho | G01S 7/023 |
| | | | 342/70 |
| 2023/0228845 A1* | 7/2023 | Zhang | G01S 13/931 |
| | | | 342/174 |
| 2024/0319326 A1* | 9/2024 | Shalita | G01S 7/295 |

FOREIGN PATENT DOCUMENTS

| | | | |
|---|---|---|---|
| CN | 114236545 A | 3/2022 | |
| CN | 114690143 A | 7/2022 | |
| CN | 115343713 A | 11/2022 | |

* cited by examiner

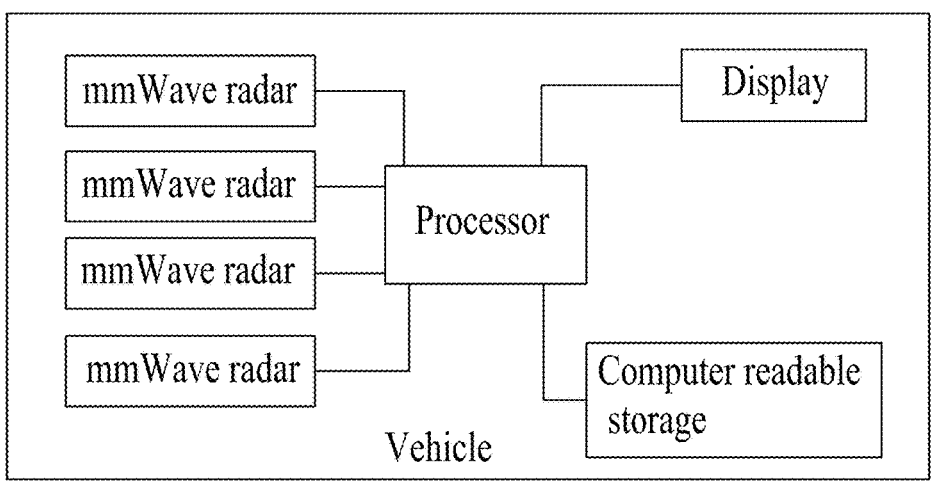
FIG. 1
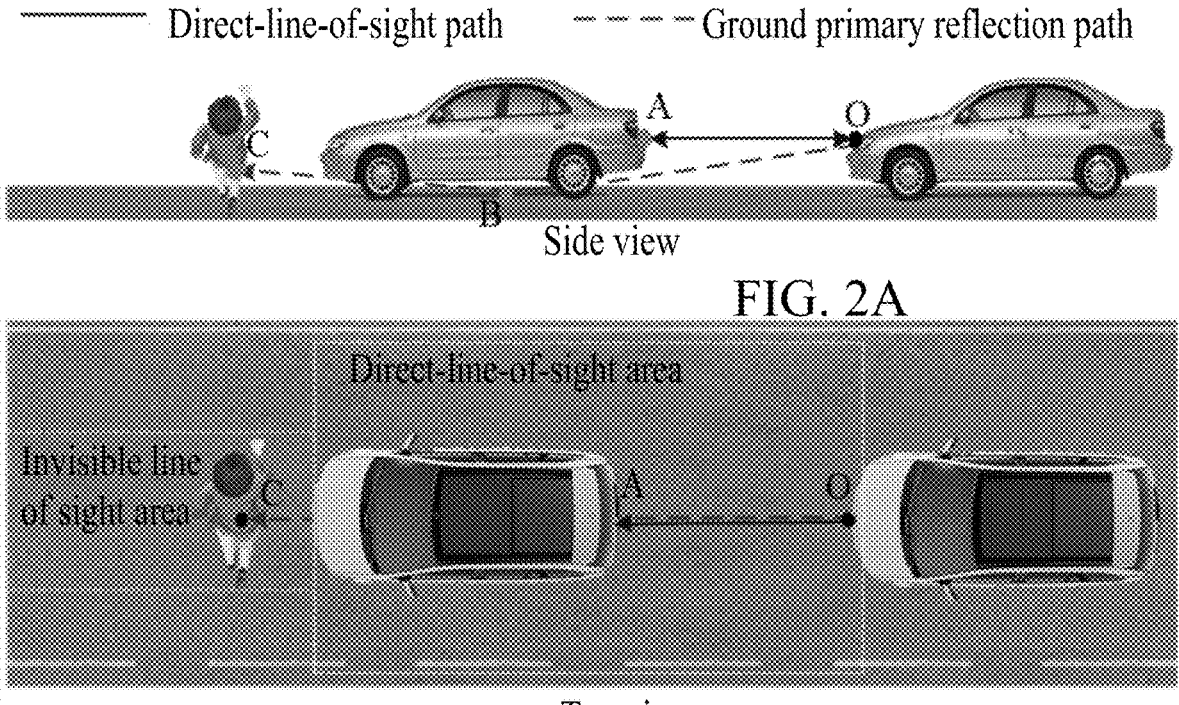
FIG. 2A
Top view
FIG. 2B

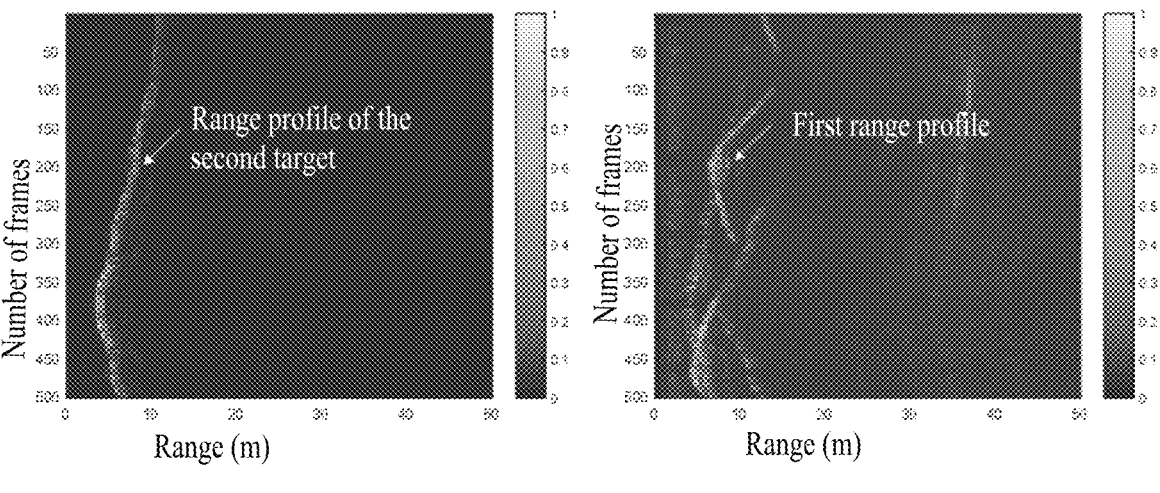
FIG. 7A                    FIG. 7B
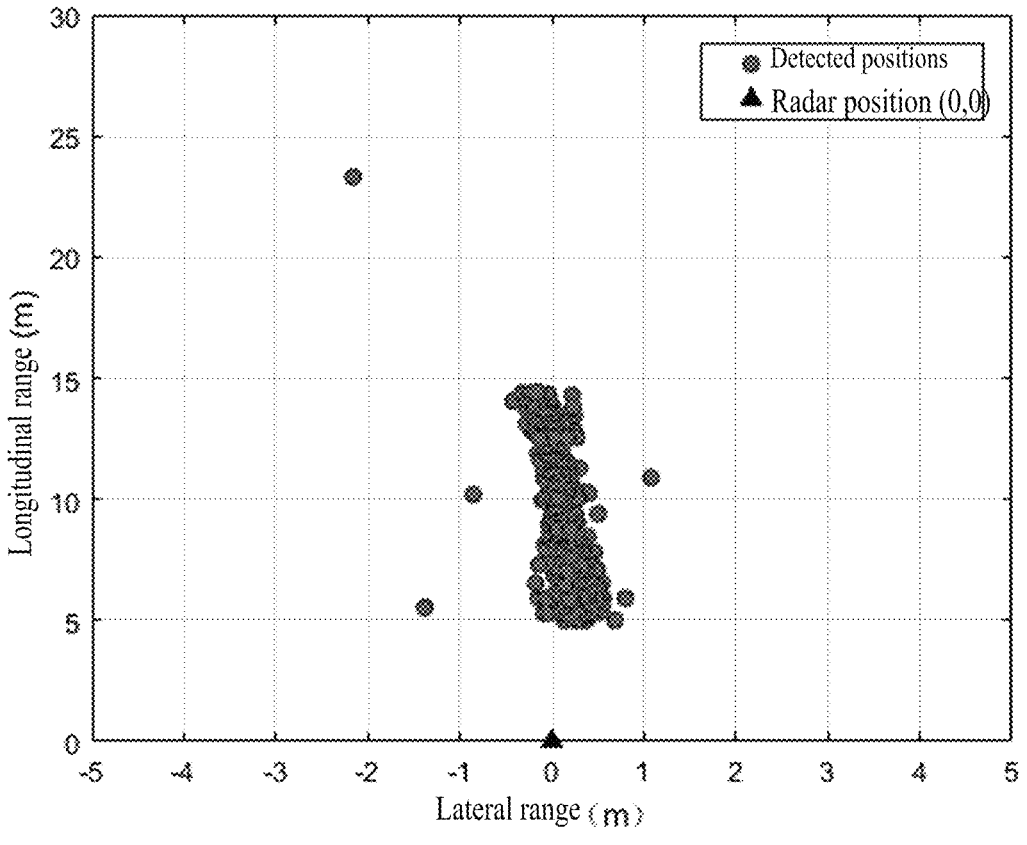
FIG. 8

OBSTACLE DETECTION METHOD AND SYSTEM OF MMWAVE RADAR AND VEHICLE

CROSS-REFERENCE TO RELATED APPLICATION

The present application claims priority of China Patent Application No. 202210828334.2, filed on Jul. 13, 2022, the contents of which are incorporated herein by reference.

BACKGROUND OF THE INVENTION

1. Technical Field

The present invention relates to the field of millimeter-wave (in other words, mmWave) radar detection, and particularly relates to a method and system for detecting obstacles with a mmWave radar, and a vehicle.

2. Description of Related Art

With the wide popularization of vehicle travel, the number of traffic accidents about pedestrian collision is increased year by year. Therefore, more and more attention is given to pedestrian safety.

At present, there are two main methods for preventing pedestrian collision accidents. The first method is passive pedestrian protection, that is, by designing a bumper, a vehicle airbag and other parts, the damage to a pedestrian due to collision is reduced by a physical protection model. The second method is active pedestrian protection such as pedestrian detection, collision warning and vehicle autonomous braking. An existing pedestrian detection measure can only prevent the pedestrian that is not shielded in front of a radar vehicle; but for when a target in front of the radar vehicle is a vehicle, a pedestrian as a weak target beside the vehicle cannot be effectively detected due to strong interference of an echo of the front vehicle. Therefore, detection on the pedestrian weak target beside the vehicle becomes one of research difficulties in the field of collision prevention with the vehicle radars.

Many foreign research institutions carry out detection researches on the pedestrians beside the vehicles. In 2017, scholars from Korean Automotive Technology Research Center have used laser radar-radar sensor fusion processing to detect a road pedestrian target (K. Kwon, S. Son, E. Hyun, et al. Radar-lidar sensor fusion scheme using occluded depth generation for pedestrian detection [C] International Conference on Computational Science and Computational Intelligence (CSCI), 2017, pp. 1811-1812). The technology uses the radar to detect a shielded pedestrian, and uses Doppler distribution to estimate the detected pedestrian that is shielded. In 2019, scholars from Waseda University have used an L-band radar to detect a non-line-of-sight pedestrian (Kawanishi. T, et al. Simple Secondary Radar for Non-Tine-of-Sight Pedestrian Detection [C]. 6th IEEE-Antennas-and-Propagation-Society (IEEE AP-S) Topical Meeting on Antenna Measurements & Applications (CAMA), 2019, pp. 151-152). In this technology, a pedestrian needs to carry a transponder, so that the radar can receive a pedestrian target echo; and a range value of the pedestrian is obtained through echo phase information. It can be seen from the above literatures that current pedestrian detection mainly detects a pedestrian target through Doppler information, and needs assistance means to detect the pedestrian for the detection on the pedestrian weak target with the radar.

However, if the pedestrian weak target beside the vehicle is near the front vehicle of the radar vehicle, due to interference of the front vehicle, the above methods are difficult to accurately judge a position of the pedestrian weak target beside the vehicle.

BRIEF DESCRIPTION OF THE SEVERAL VIEWS OF THE DRAWINGS

The foregoing and other exemplary purposes, aspects and advantages of the present invention will be better understood in principle from the following detailed description of one or more exemplary embodiments of the invention with reference to the drawings, in which:

FIG. 1 is a schematic functional diagram of a vehicle in accordance with the present invention.

FIG. 2A and FIG. 2B are schematic application scenes of the vehicle and an obstacle detection method in accordance with the present invention.

FIG. 7A is a schematic diagram of a range profile of a second target and FIG. 7B is a schematic diagram of a range profile of a first target in obstacle detection method of the present invention.

FIG. 8 is a positioning schematic diagram of a first target in an obstacle detection method of the present invention.

DETAILED DESCRIPTION OF THE INVENTION

Figure 3:
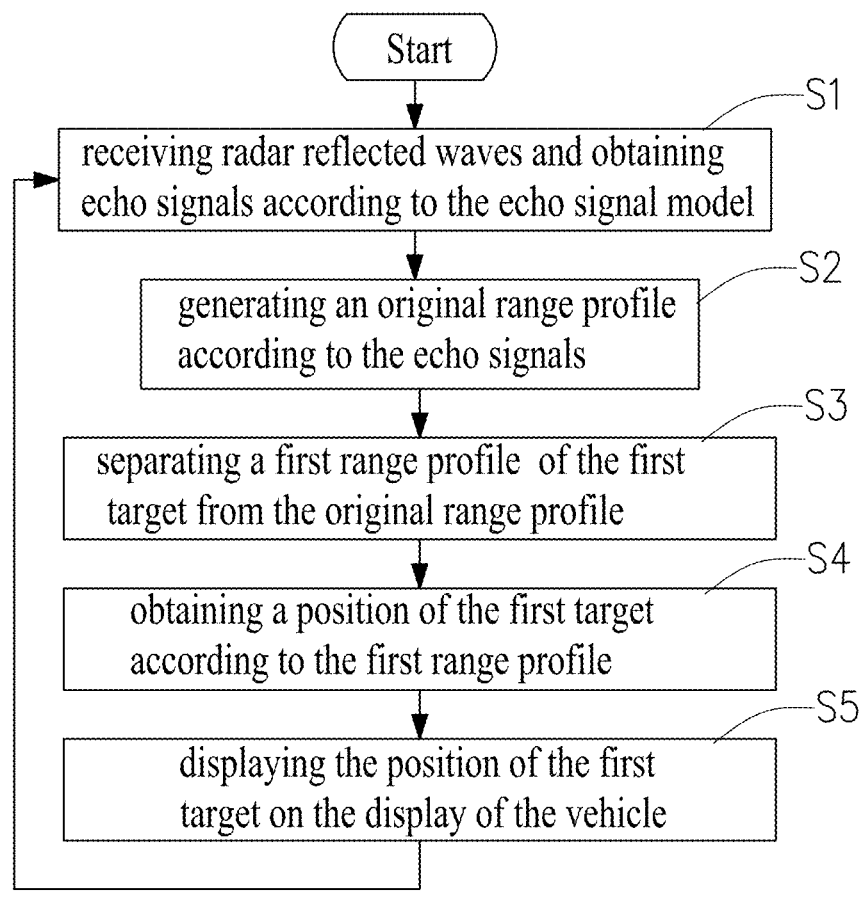
FIG. 3 is a schematic flow chat of an obstacle detection method of the present invention.

The invention will now be described in detail through several embodiments with reference to the accompanying drawings.

First Embodiment

Please refer to FIG. 1, a vehicle in accordance with the present invention may include one or more mmWave radars, a display, a computer readable storage, and one or more processors.

The one or more mmWave radars may be fixed to any position of the vehicle, such as a head (may be a middle position above or below a bumper), two sides and the tail of the vehicle, so as to detect objects around the vehicle. The mmWave radar is used to transmit electromagnetic wave signals that objects in their path then reflect. By capturing reflected waves, the mmWave radar can determine a range, velocity and angle of the objects. The electromagnetic wave signals have a wavelength that is in the millimeter range.

The display may be fixed to an instrument panel or a console of the vehicle, and is connected to the one or more processors. The display is used for displaying information to users.

The computer readable storage is used for storing echo signal models and a computer program.

The one or more processors is configured for executing the computer program stored in the computer readable storage to implement an obstacle detection method and display a position of a first target on the display after the computer program is executed to output the position. The one or more processors may be controlled by a vehicular MCU (microcontroller unit) or a SoC (system-on-chip) terminal of the advanced driver assistance systems (ADAS) of the vehicle.

By executing the obstacle detection method, first targets which are in front of or beside a second target and are in an invisible line of sight of the mmWave radar can be detected accurately, improving the safety and the robustness of the ADAS, more effectively protecting a laterally shuttling obstacle (such as a crossing pedestrian) to effectively avoid an accident caused by the laterally moving object during driving, and then improving the user experience.

FIG. 2A and FIG. 2B show an application scene of the obstacle detection method of the present invention. Letter O in FIG. 2A and FIG. 2B represents the mmWave radar fixed to the head of the vehicle of the present invention. Letter A represents the second target, a car in this embodiment, in front of the vehicle of the present invention. The second target A is moving or stopped in a visible direct line of sight area of the mmWave radar O. Letter C represents the first target, a pedestrian crossing the road in this embodiment, in front of or beside the second target A, and is in an invisible line of sight area of the mmWave radar O, because the second target A blocks the electromagnetic wave signals of the mmWave radar O. The first target C may also be animals. Although the first target C is in the invisible line of sight area of the mmWave radar O, it may also be detected by the mmWave radar O through ground reflection paths (in FIG. 2A and FIG. 2B, only the ground primary reflection path is shown).

That is, radar detection echo paths at least include a direct-line-of-sight path and ground reflection paths. The echo signal models stored in the computer readable storage of the vehicle is constructed according to the direct-line-of-sight path and the ground primary reflection path. In the direct-line-of-sight path, the mmWave radar O may directly detect the first target and the second target, the echo path is: O→C→O and O→A→O, that is, after a transmitted wave reaches the first target/second target, an echo is directly reflected.

In the ground primary reflection paths, the mmWave radar O cannot directly detect the first target C, it indicates that the first target C is right located in front of or beside but be blocked by the second target A, leading to that the mmWave radar O cannot directly reach the first target. The echo path at this time is: O→B→C→B→O, that is, the mmWave radar O transmits a detection wave at a preset frequency, and the detection wave is reflected by a ground point B to the first target C and then returns in the same path.

The echo signal models are constructed according to a plurality of first targets and second targets for testing. The construction method of the echo signal models includes: obtaining echo path delays of the first targets and the second targets respectively according to detection paths of the mmWave radar, and constructing the echo signal models according to the echo path delays.

Preferably, a specific process of constructing the echo signal models may be as follows:
An expression of a linear frequency-modulated signal transmitted by the mmWave radar is set as follows:

$$s(t) = A_0 \, \exp\left(j2\pi f_0 t + j\pi\mu t^2\right) u(t);$$

-continued $$\text{and } u(t) = \begin{cases} 1, 0 < t < T \\ 0, \text{ others} \end{cases};$$

$f_0$ represents a carrier frequency; $A_0$ represents an amplitude of the transmitted signal; $\mu = B/T$ is a linear frequency modulation slope; $j = \sqrt{-1}$, a signal bandwidth is expressed as B; a pulse time is expressed as T; and u(t) is a moment function.

At this time, the radar echo signal may be divided into two combinations, one is that the echo contains $\tau_{path-1}$ and $\tau_{path-2}$, and the other is that the echo contains $\tau_{path-1}$ and $\tau_{path-3}$. Therefore, the two echo signal models may be expressed as:

$$y_1(t) = \sigma_1 S(t - \tau_{path-1}) + \sigma_2 s(t - \tau_{path-2}) + n(t);$$

$$y_2(t) = \sigma_1 s(t - \tau_{path-1}) + \sigma_2 s(t - \tau_{path-3}) + n(t);$$

$\sigma_1$ is a scattering coefficient of the second target; $\sigma_2$ is a scattering coefficient of the first target; and n(t) represents background noise.

Further, based on the above radar detection echo paths, let $\tau_{path-1}$ be a direct-line-of-sight echo path delay of detecting the second target (that is, the echo path delay of a second target which is detected in a direct-line-of-sight path), $\tau_{path-2}$ be an echo path delay of a first target which is detected in a ground primary reflection path, and $\tau_{path-3}$ be a direct-line-of-sight path of the first target (that is, the echo path delay of a first target which is detected in a direct-line-of-sight path). Then specific expressions of the echo path delays of the first targets and the second targets are as follows:

$$\begin{cases} \tau_{path-1} = \dfrac{2|OA|}{c} \\ \tau_{path-2} = \dfrac{2(|OB| + |BC|)}{c} \\ \tau_{path-3} = \dfrac{2|OC|}{c} \end{cases},$$

c is an electromagnetic wave propagation velocity, OA is a direct distance between the mmWave radar and the second target, OC is a direct distance between the mmWave radar and the first target. OB and BC are indirect distances between the mmWave radar and the first target, returning echo from the first target is reflected by the ground at a point B as a middle reflection point then received by the mmWave radar. And c is an electromagnetic wave propagation velocity.

Based on this, the obstacle detection method of the present invention mainly includes the following steps S1 to S5 (see FIG. 3).

S1, receiving radar reflected waves and obtaining echo signals corresponding to the first and second targets according to the echo signal models $y_1(t)$, $y_2(t)$. Depending on the echo signal models $y_1(t)$, $y_2(t)$, the selected echo signals are from at least one second target A which is in a direct line of sight of the mmWave radar O and at least one first target C which is in front of or beside the second target A and is in an invisible line of sight of the mmWave radar O.

S2, generating an original range profile X according to the echo signals. In the embodiment, performing fast time dimension Fourier transform processing on the echo signal to obtain the original range profile X, and $X \in C^{M \times N}$.

S3, separating a first range profile $X_{human}$ of the first target from the original range profile X. That is, separating the echo signals on the original range profile to obtain the first range profile $X_{human}$. When the mmWave radar O is used to detect the first target C, as the radar O keeps in a motion state following the second target A, there is no stationary target in an environment for the radar O, and the traditional static clutter cancellation method cannot be adopted to eliminate the echo signal of the second target A. Considering the problem that the echo of the second target A cannot be eliminated, which leads to difficulty of detecting the first target, the present invention uses the signal separation method to separate the first range profile from the original range profile.

The separation of the first range profile $X_{human}$ mainly include Fourier transform and signal separation, which may be specifically as follows:

S31, de-averaging the original range profile X to obtain a de-averaged matrix $\overline{X}$. In detail, the original range profile $X \in C^{M \times N}$ may be de-averaged: setting M periods for each radar signal, totally N radar signals are received; and an input vector is defined as $[x_{1,n} \ldots x_{M,n}]^T$, and an original range profile matrix is defined as $X = [x_1 \ldots x_N]$, wherein $x_{m,n}$ is the nth range value of the mth period, n=1, ... N; m=1, ... M. An average vector of the original range profile $X \in C^{M \times N}$ is defined as $\mu = [\mu_1 \ldots \mu_M]^T$; a de-averaging operation for the input vector may be expressed as $\overline{x}_n = x_n - \mu$; and the de-averaged matrix $\overline{X}$ may be expressed as $X = [\overline{x}_1 \ldots \overline{x}_N]$.

S32: Calculating a covariance matrix D of the de-averaged matrix $\overline{X}$, performing eigenvalue decomposition to the covariance matrix D, arranging eigenvalues in a descending order, and selecting eigenvectors corresponding to the first k eigenvalues as a mapping matrix for dimensionality reduction to obtain a matrix $X_{front}$ which contains principal component information of the second target, then calculating the first range profile $X_{human}$ of the first target according to the original range profile X and the matrix $X_{front}$.

In the above process, a formula of calculating the covariance matrix of the de-averaged matrix $\overline{X}$ may be as follows:

$$D = \frac{1}{N} \overline{X}\overline{X}^T.$$

A formula of performing eigenvalue decomposition on the covariance matrix may be as follows:

$$D = U \Sigma U^{-1}.$$

after eigenvalue decomposition, $\Sigma$ is a diagonal matrix; U is a matrix composed of eigenvectors of the matrix D; and the corresponding eigenvectors are $U_1, \ldots, U_M$. Then, the eigenvectors are arranged in the descending order according to the corresponding eigenvalues; and at this time, the eigenvectors corresponding to the first k eigenvalues are selected as the mapping matrix for dimensionality reduction. The mapping matrix may be expressed as $\overline{U} = [U_1 \ldots U_k]$. Then, the data matrix after dimensionality reduction may be expressed as:

$$X_{front} = \overline{U}^T \overline{X}.$$

This is because the first range profile $X_{human}$ of the first target and the second target's range profile ($X_{front}$) are mixed to form the original range profile X. The signal intensity of the second target is maximal, which may be approximately considered that the original range profile X mainly contains the second target's range profile. Therefore, dimension reduction is performed to obtain the matrix $X_{front}$ which is considered include the principal component information of the second target, so that the range profile separation process between the first target and the second target is substantially completed. The first range profile $X_{human}$ may be calculated as follows:

$$X_{human} = X - X_{front}$$

Preferably, an incoherent superposition and a constant false alarm rate detection may be used to test and calculate the obtained first range profile. The specific step is as follows:

The incoherent superposition method is used to accumulate an amplitude value at the target in the range profile. The process of incoherent superposition processing on the first target may be expressed as:

$$g_{human}(i) = X_{j=M(h-1)+1}^{Mh} |x_{human,j}(i)|;$$

In the formula, j represents a number of periods; i is a number of range units; h is a number of indexes of frames; and $|\cdot|$ represents an absolute value taking operation.

After the amplitude value at the first target is accumulated, a cell average constant false alarm rate (CA-CFAR) detection method is used to detect a one-dimensional range profile of the first target after accumulation. For the ith range unit, a detection threshold may be expressed as:

$$TH_{human,i} = \left( (P_f)^{-\frac{1}{N_r}} - 1 \right) \sum_{i=1}^{N_r} g_{human,h}(i);$$

In the formula, $P_f$ represents a false alarm probability; and $N_r$ represents a number of reference units.

Then, the first range profile $R_{human}$ of the first target is obtained by comparing all range unit values in the first range profile $X_{human}$ with the detection thresholds.

S4, obtaining a position of the first target according to the first range profile $X_{human}$ In the embodiment, an MVDR angle measurement method may be used to obtain a two-dimensional position coordinate as the position.

For a uniform linear array model, a receiving-direction vector $a(\theta)$ of an antenna of the mmWave radar may be expressed as:

$$a(\theta) = \left[ 1 \ e^{-j\phi} \ \cdots \ e^{-j(K-1)\phi} \right]^T;$$

$$\phi = 2\pi d \sin\theta/\lambda;$$

d is a spacing between adjacent antennas in the mmWave radar; $\phi$ is a phase difference between adjacent antennas; k is a number of the antennas; $\theta$ is an incidence angle of a radar signal; and $\lambda$ is a wavelength of the radar signal.

Then, an azimuth angle of the target is calculated using a minimum variance distortionless response (MVDR) method. An average output power $P(\theta)$ of a spatial filter may be expressed as:

$$P_{MVDR}(\theta) = \frac{1}{a^H(\theta) R^{-1} a(\theta)};$$

R represents an autocorrelation matrix of an input matrix $X_{human}$ of the first range profile, $R=E\{x_{human}(j)x_{human}{}^{H}(j)\}$.

Then, $\theta$ in the direction vector is changed in an angle interval $[-\pi, \pi]$ to obtain a $P_{MVDR}(\theta)$ change curve; then a spectrum peak search is performed, and at this time, an angle corresponding to a peak point is the azimuth angle $\theta_{human}$ of the first target.

After the azimuth angle $\theta_{human}$ of the first target is obtained by applying the MVDR angle measurement method, in combination with the first target's range profile $R_{human}$, the position, represented by a two-dimensional position coordinate, of the first target may be calculated as follows:

$$\begin{cases} x_{human} = R_{human}\sin \theta_{human} \\ y_{human} = R_{human}\cos \theta_{human} \end{cases}.$$

S5, displaying the position of the first target on the display of the vehicle.

The vehicle of the present invention effectively solves the problem that when the vehicular millimeter-wave radar is adopted to detect the first target (a person or an animal), a traditional static clutter cancellation method cannot be adopted to eliminate the echo signal of the second target as the radar keeps in a motion state following the second target (such as a vehicle) is effectively solved; and a signal separation method is adopted to separate the first target's range profile from the original echo range profile, thereby reducing interference of the second target, and obtaining an accurate positioning result of the first target. Thereby accurately and effectively determining and detecting a moving target, improving the safety and the robustness of an entire ADAS, more effectively protecting a laterally shuttling obstacle (such as a crossing pedestrian) to effectively avoid an accident caused by the laterally moving object during driving, and then improving the user experience.

Second Embodiment

Figure 4:
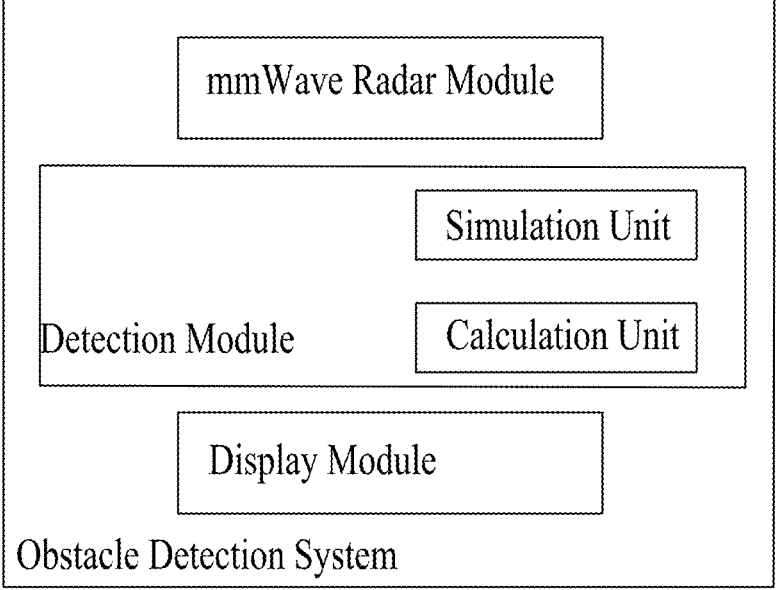
FIG. 4 is a functional diagram of an obstacle detection system in accordance with the present invention.

The present invention further provides an obstacle detection system as shown in FIG. 4. The obstacle detection system mainly includes a mmWave radar module, a detection module and a display module. The radar module is used for detecting detection targets in a detection scene by transmitting electromagnetic wave signals and capturing reflected waves. The detection module is used for detecting at least one second target which is in a direct line of sight of the mm-Wave radar module and at least one first target which is in front of or beside the second target and is in an invisible line of sight of the mm-Wave radar module according to the reflected waves. The detection module may include a simulation unit, a calculation unit, and a display module.

The simulation unit is used for obtaining echo signals according to echo signal models which are storied therein and the reflected waves, the echo signals being from the at least one second target and the first target. The calculation unit is used for generating an original range profile X according to the echo signals, separating a first range profile $X_{human}$ of the first target from the original range profile X, obtaining a two-dimensional position coordinate of the first target according to the first range profile $X_{human}$, and determining a position of the first target. The display module is used for presenting the position of the first target. That is, the simulation unit and the calculation unit together can implement the above-described obstacle detection method and has the same benefit of the vehicle in the first embodiment.

The calculation unit may obtain the first range profile $X_{human}$ by separating the echo signals on the original range profile, then obtain a two-dimensional position coordinate of the first target using an MVDR angle measurement method: perform fast time dimension Fourier transform processing on the echo signals to obtain an original range profile $X \in C^{M \times N}$, and de-average the original range profile X to obtain a de-averaged matrix $\bar{X}$, and calculate a covariance matrix D of the de-averaged matrix $\bar{X}$, perform eigenvalue decomposition, arrange eigenvalues in a descending order, select eigenvectors corresponding to the first k eigenvalues as a mapping matrix for dimensionality reduction to obtain a matrix $X_{front}$ containing principal component information of the second target, and calculate the first range profile $X_{human}$ according to the original range profile X and a matrix $X_{front}$ of the principal component information of the second target.

Figure 5:
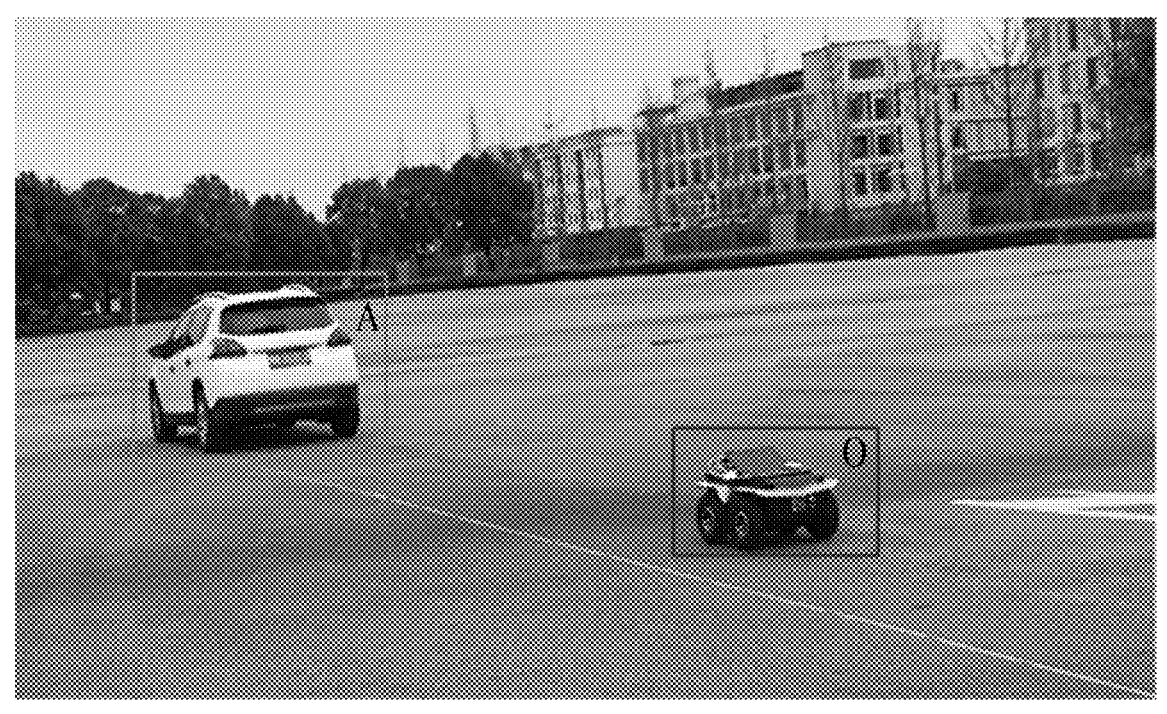
FIG. 5 is a measurement scene of the vehicle and the obstacle detection system of the present invention.

A first target is detected based on an obstacle detection method. An actual measurement scene is shown in FIG. 5. The scene includes a radar system having a mmWave radar loaded on a remote controlled small flat car, and a stationary hatchback car acting as a second target. An unshown pedestrian will walk around the stationary hatchback car to act as a first target.

The mmWave radar is a linear frequency-modulated continuous mmWave radar. Assume the radar frequency is set to 77 G, bandwidth is set to 500 MHz, a radar position is set to the center origin O (0, 0), and a height of the radar is set to 0.35 m relative to the ground. In an initial stage of an experiment, the second target A keeps stationary, and the radar O is 15 m away from the second target. In the experiment, remote controlling the small flat car to move the radar O back and forth within 5-15 m from the second target A, while the pedestrian (the first target) keep moving around the stationary second target A.

Figure 6:
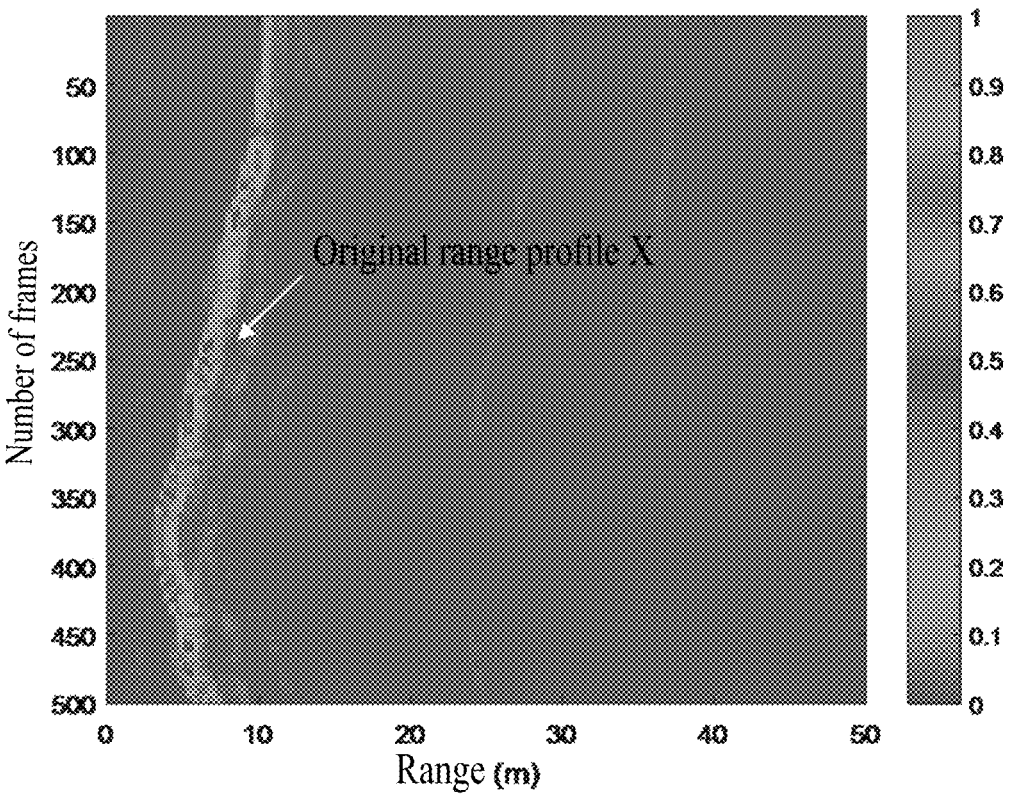
FIG. 6 is a schematic diagram of an original range profile in an obstacle detection method of the present invention.

According to the processing steps of the present invention, the original range profile is first obtained by a Fourier transform operation, as shown in FIG. 6. The original range profile includes the range profiles of the second target and the first target beside or in front of the second target. Because the first target (the pedestrian) keeps moving around the second target A, the two range profiles are fused, and it is difficult to distinguish the range profile of the first target from the original range profile.

Afterwards, separation is performed on the original range profile to obtain the range profiles of the second target and the first target, as shown in FIG. 7A and FIG. 7B. Then, the incoherent superposition and CFAR detection are performed on the first range profile of the first target, to obtain a range value of the first target.

An MVDR angle measurement algorithm is used to calculate an angle of the first target. Finally, positioning trace points of the first target are obtained from a position coordinate of the first target, as shown in FIG. 8.

Comprehensive analysis shows that the positions of the first target are consistent with a motion law of the radar system, and an accurate positioning result of the first target is obtained.

Each component embodiment of the present invention may be realized in hardware, or in software modules running on one or more processors, or in a combination thereof. Those skilled in the art should understand that a microprocessor or digital signal processor (DSP) may be used in practice to implement some or all of the functions of some modules according to the embodiments of the present invention. The present invention may also implement device programs (e.g., computer programs and computer program products) for performing part or all of the methods described herein. Such programs for implementing the present invention may be stored on a computer readable or may have the form of one or more signals. Such signals may be downloaded from Internet sites, or provided on carrier signals, or provided in any other form.

It should be noted that herein, relationship terms of first, second and the like herein are just used for differentiating one entity or operation from the other entity or operation, and do not necessarily require or imply any practical relationship or sequence between the entities or operations. Moreover, terms of "comprise", "include" or any other variant are intended to cover non-exclusive inclusion, so that a process, a method, an article or a device which includes a series of elements not only includes such elements, but also includes other elements not listed clearly or also includes inherent elements in the process, the method, the article or the device. Under the condition of no more limitation, the elements defined by a sentence "include one . . . " do not exclude additional identical elements in the process, the method, the article or the device which includes the elements.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. An obstacle detection method with mm Wave radar, comprising:

transmitting radar electromagnetic wave signals and receiving radar reflected waves via at least one mm Wave radar;

obtaining echo signals according to echo signal models, the echo signals being from at least one second target which is in a direct line of sight of the mm Wave radar and at least one first target which is in front of or beside the second target and is in an invisible line of sight of the mm Wave radar;

generating an original range profile $\overline{X}$ according to the echo signals;

separating a first range profile $X_{human}$ of the first target from the original range profile $\overline{X}$; and obtaining a position of the first target according to the first range profile $X_{human}$; and presenting the position of the first target on a display;

wherein a method for separating the first range profile $X_{human}$ of the first target from the original range profile $\overline{X}$ comprises:

de-averaging the original range profile $\overline{X}$ to obtain a de-averaged matrix $\overline{X}$;

calculating a covariance matrix D of the de-averaged matrix $\overline{X}$;

performing eigenvalue decomposition to the covariance matrix D and arranging eigenvalues in a descending order;

selecting eigenvectors corresponding to the first k eigenvalues as a mapping matrix for dimensionality reduction to obtain a matrix $X_{front}$ which contains principal component information of the second target; and calculating the first range profile $X_{human}$ of the first target according to the original range profile $\overline{X}$ and the matrix $X_{front}$.

10

2. The obstacle detection method according to claim 1, wherein the echo signal models are constructed according to a plurality of first targets and second targets;

wherein a construction method of the echo signal models comprises:

obtaining echo path delays of the first targets and the second targets respectively according to detection paths of the mmWave radar, and constructing the echo signal models according to the echo path delays.

3. The obstacle detection method according to claim 2, wherein the echo path delays are specifically as follows:

$$\begin{cases} \tau_{path-1} = \dfrac{2|OA|}{c} \\[2mm] \tau_{path-2} = \dfrac{2(|OB| + |BC|)}{c} \\[2mm] \tau_{path-3} = \dfrac{2|OC|}{c} \end{cases},$$

wherein $\tau_{path-1}$ is the echo path delay of the second target which is detected in a direct-line-of-sight path; $\tau_{path-2}$ is the echo path delay of the first target which is detected in a ground primary reflection path; $\tau_{path-3}$ is the echo path delay of the first target which is detected in a direct-line-of-sight path; OA is a direct distance between the mm Wave radar and the second target; OC is a direct distance between the mmWave radar and the first target; OB and BC are indirect distances between the mm Wave radar and the first target, returning echo from the first target is reflected by the ground at a point B as a middle reflection point then received by the mmWave radar; and c is an electromagnetic wave propagation velocity.

4. The obstacle detection method according to claim 3, wherein a linear frequency-modulated signal of the mm Wave radar is set as follows:

$$s(t) = A_0 \, \exp\!\left(j2\pi f_0 t + j\pi\mu t^2\right) u(t);$$

$$u(t) = \begin{cases} 1, 0 < t < T \\ 0, \text{others} \end{cases};$$

formulas of constructing the echo signal models are as follows:

$$y_1(t) = \sigma_1 S(t - \tau_{path-1}) + \sigma_2 s(t - \tau_{path-2}) + n(t);$$

$$y_2(t) = \sigma_1 s(t - \tau_{path-1}) + \sigma_2 s(t - \tau_{path-3}) + n(t);$$

wherein $f_0$ is a carrier frequency, $A_0$ is an amplitude of a transmitted signal, $\mu = B/T$ isa linear frequency modulation slope, $j = \sqrt{-1}$ and B is signal bandwidth, T is a pulse time, u(t) is a moment function; $\sigma_1$ is a scattering coefficient of the second target; $\sigma_2$ is a scattering coefficient of the first target; and n(t) represents background noise.

5. The obstacle detection method according to claim 1, wherein the position is represented by a two-dimensional position coordinate of the first target, and is obtained using a minimum variance distortionless response (MVDR) angle measurement method.

6. The obstacle detection method according to claim 1, wherein the original range profile X is obtained by performing fast time dimension Fourier transform processing on the echo signals.

7. An obstacle detection system, comprising:
a mm Wave radar module, configured for transmitting electromagnetic wave signals and capturing reflected waves;
a detection module, configured for detecting at least one second target which is in a direct line of sight of the mm-Wave radar and at least one first target which is in front of or beside the second target and is in an invisible line of sight of the mm-Wave radar according to the reflected waves; and
a display module, at least configured for presenting a position of the first target;
wherein the detection module comprises:
a simulation unit, configured for obtaining echo signals according to echo signal models which are stored therein and the reflected waves, the echo signals being from the at least one second target and the first target; and
a calculation unit, configured for generating an original range profile X according to the echo signals, separating a first range profile $X_{human}$ of the first target from the original range profile X, obtaining the position of the first target according to the first range profile $X_{human}$;
wherein the calculation unit separates the first range profile $X_{human}$ of the first target from the original range profile X by:
de-averaging the original range profile X to obtain a de-averaged matrix $\overline{X}$;
calculating a covariance matrix D of the de-averaged matrix $\overline{X}$;
performing eigenvalue decomposition to the covariance matrix D and arranging eigenvalues in a descending order;
selecting eigenvectors corresponding to the first k eigenvalues as a mapping matrix for dimensionality reduction to obtain a matrix $X_{front}$ which contains principal component information of the second target; and
calculating the first range profile $X_{human}$ of the first target according to the original range profile X and the matrix $X_{front}$.

8. The obstacle detection system according to claim 7, wherein the simulation unit is further configured for constructing the echo signal models according to a plurality of first targets and second targets.

9. The obstacle detection system according to claim 8, wherein a construction method of the echo signal models comprises:
obtaining echo path delays of the first targets and the second targets respectively according to detection paths of the mm-Wave radar, and constructing the echo signal models according to the echo path delays.

10. The obstacle detection system according to claim 9, wherein the echo path delays are specifically as follows:

$$\begin{cases} \tau_{path-1} = \dfrac{2|OA|}{c} \\ \tau_{path-2} = \dfrac{2(|OB| + |BC|)}{c} \\ \tau_{path-3} = \dfrac{2|OC|}{c} \end{cases};$$

wherein $\tau_{path-1}$ is the echo path delay of the second target which is detected in a direct-line-of-sight path; $\tau_{path-2}$ is the echo path delay of the first target which is detected in a ground primary reflection path; $\tau_{path-3}$ is

12 the echo path delay of the first target which is detected in a direct-line-of-sight path; OA is a direct distance between the mm-Wave radar and the second target; OC is a direct distance between the mm-Wave radar and the first target; OB and BC are indirect distances between the mm-Wave radar and the first target, returning echo from the first target is reflected by the ground at a point B as a middle reflection point then received by the mm-Wave radar; and c is an electromagnetic wave propagation velocity.

11. The obstacle detection system according to claim 10, wherein a linear frequency-modulated signal of the mm-Wave radar is set as follows:

$$s(t) = A_0 \exp\left(j2\pi f_0 t + j\pi\mu t^2\right) u(t);$$

$$u(t) = \begin{cases} 1, 0 < t < T \\ 0, \text{others} \end{cases};$$

formulas of constructing the echo signal models are as follows:

$$y_1(t) = \sigma_1 S(t-\tau_{path-1}) + \sigma_2 s(t-\tau_{path-2}) + n(t);$$

$$y_2(t) = \sigma_1 s(t-\tau_{path-1}) + \sigma_2 s(t-\tau_{path-3}) + n(t);$$

wherein $f_0$ is a carrier frequency, $A_0$ is an amplitude of a transmitted signal, $\mu=B/T$ is a linear frequency modulation slope, $j=\sqrt{-1}$ and B is signal bandwidth, T is a pulse time, u(t) is a moment function; $\sigma_1$ is a scattering coefficient of the second target; $\sigma_2$ is a scattering coefficient of the first target; and n(t) represents background noise.

12. The obstacle detection system according to claim 7, wherein the position is represented by a two-dimensional position coordinate of the first target, and is obtained using a minimum variance distortionless response (MVDR) angle measurement method.

13. The obstacle detection system according to claim 7, wherein the original range profile X is obtained by performing fast time dimension Fourier transform processing on the echo signals.

14. A vehicle, comprising:
a display;
at least one mm Wave radar, configured for transmitting electromagnetic wave signals and capturing reflected waves;
a computer readable storage, configured for storing echo signal models and a computer program; and
one or more processors, configured for executing the computer program to implement an obstacle detection method to obtain a position of a first target and display the position of the first target on the display;
wherein the obstacle detection method comprises:
obtaining echo signals according to the reflected waves and the echo signal models, the echo signals being from at least one second target which is in a direct line of sight of the mm Wave radar and at least one first target which is in front of or beside the second target and is in an invisible line of sight of the mm Wave radar;
generating an original range profile according to the echo signals;
separating a first range profile of the first target from the original range profile; and
obtaining the position of the first target according to the first range profile;

wherein the calculation unit separates the first range profile $X_{human}$ of the first target from the original range profile X by:

de-averaging the original range profile X to obtain a de-averaged matrix $\overline{X}$;

calculating a covariance matrix D of the de-averaged matrix $\overline{X}$;

performing eigenvalue decomposition to the covariance matrix D and arranging eigenvalues in a descending order;

selecting eigenvectors corresponding to the first k eigenvalues as a mapping matrix for dimensionality reduction to obtain a matrix $X_{front}$ which contains principal component information of the second target; and calculating the first range profile $X_{human}$ of the first target according to the original range profile X and the matrix $X_{front}$.

15. The vehicle according to claim 14, wherein the echo signal models are constructed according to a plurality of first targets and second targets;

wherein a construction method of the echo signal models comprises:

obtaining echo path delays of the first targets and the second targets respectively according to detection paths of the mmWave radar, and constructing the echo signal models according to the echo path delays;

wherein the echo path delays are specifically as follows:

$$\begin{cases} \tau_{path-1} = \dfrac{2|OA|}{c} \\[2mm] \tau_{path-2} = \dfrac{2(|OB| + |BC|)}{c} \\[2mm] \tau_{path-3} = \dfrac{2|OC|}{c} \end{cases};$$

wherein $\tau_{path-1}$ is the echo path delay of the second target which is detected in a direct-line-of-sight path; $\tau_{path-2}$ is the echo path delay of the first target which is detected in a ground primary reflection path; $\tau_{path-3}$ is the echo path delay of the first target which is detected in a direct-line-of-sight path; OA is a direct distance between the mmWave radar and the second target; OC is a direct distance between the mmWave radar and the first target; OB and BC are indirect distances between the mm Wave radar and the first target, returning echo from the first target is reflected by the ground at a point B as a middle reflection point then received by the mmWave radar; and c is an electromagnetic wave propagation velocity.

16. The vehicle according to claim 15, wherein a linear frequency-modulated signal of the mmWave radar is set as follows:

$$s(t) = A_0 \exp\left(j2\pi f_0 t + j\pi\mu t^2\right) u(t);$$

$$u(t) = \begin{cases} 1, \ 0 < t < T \\ 0, \ \text{others} \end{cases};$$

formulas of constructing the echo signal models are as follows:

$$y_1(t) = \sigma_1 S(t - \tau_{path-1}) + \sigma_2 s(t - \tau_{path-2}) + n(t);$$

$$y_2(t) = \sigma_1 s(t - \tau_{path-1}) + \sigma_2 s(t - \tau_{path-3}) + n(t);$$

wherein $f_0$ is a carrier frequency, $A_0$ is an amplitude of a transmitted signal, $\mu = B/T$ is a linear frequency modulation slope, $j = \sqrt{-1}$ and B is signal bandwidth, T is a pulse time, u(t) is a moment function; $\sigma_1$ scattering coefficient of the second target; $\sigma_2$ is a scattering coefficient of the first target; and n(t) represents background noise.

\* \* \* \* \*